June 12, 1934.  J. HEDDON  1,962,869
FISHING ROD
Filed Jan. 11, 1933
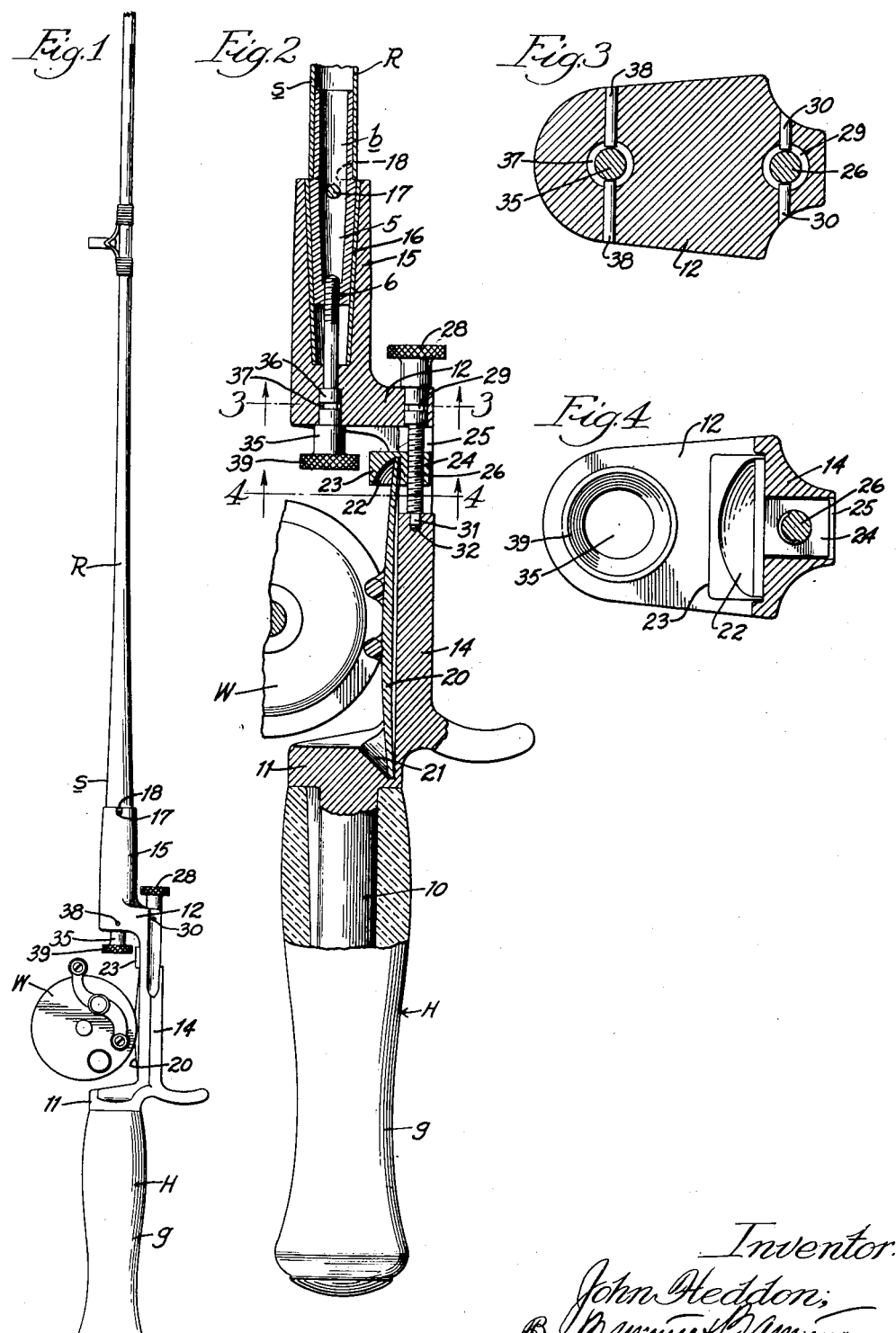
Inventor:
John Heddon Patented June 12, 1934

1,962,869

UNITED STATES PATENT OFFICE 1,962,869

FISHING ROD

John Heddon, Hollywood, Calif., assignor to James Heddon's Sons, Dowagiac, Mich., a corporation of Michigan Application January 11, 1933, Serial No. 651,068

12 Claims. (Cl. 43—22)

This invention relates to a fishing rod, being concerned with certain improvements in (1) a locking connection between the butt end of a rod and the handle therefor, and (2) securement of a reel which is adapted to be removably seated on the handle. Both connections which are of similar character provide a ready and dependable fastening for the engaged parts, and permit also a ready disassembly of these parts as occasion may require.

A suggestive embodiment of this invention is set forth in the accompanying drawing wherein—

Figure 1 is a view in elevation of a fishing rod equipped with my improved means for interconnecting a handle and its associated rod, also the fastening for a reel which is mounted on the handle;

Fig. 2 is a longitudinal section on an enlarged scale showing the same devices; and Figs. 3 and 4 are details in enlarged transverse section taken on lines 3—3 and 4—4, respectively, of Fig. 2.

By way of example I have illustrated a rod R which, if desired, may be of steel with a swelled butt end s. Fitted to this end of the rod is a bushing b forming part of an adapter 5 which is exteriorly tapered, as shown. At the outer or smaller end of the adapter is a transverse wall having a threaded opening 6 therethrough. Such an adapter, which is desirably made of non-corrosive metal, may be permanently and immovably secured to the rod, as by brazing, soldering or welding.

The handle H to which the rod is joined is provided with a grip g which surrounds a stem 10 projected from a transverse wall 11. Between this wall and a second transverse wall 12 is an offset connecting plate 14 forming a seat for a reel W. Beyond the wall 12 the handle continues in the form of a socketed extension 15 internally tapered in conformity with the adapter. Desirably this extension is fitted with a lining 16 of brass against which the adapter is seated when the rod and handle are joined. To assure interfitting in a predetermined rotative position, I suggest use of a cross pin 17 extending through the adapter, the pin ends being projected sufficiently to lie within a pair of slots 18 arranged diametrically on opposite sides of the socketed extension, as indicated in Fig. 1. Insertion of the rod to its final position within the handle socket may be accomplished only when the pin ends are both aligned with and entered into the slots 18.

The reel W may have the usual base plate 20 one end of which may be confined within and against an undercut 21 in the transverse wall, providing, in effect, a fixed hood. I provide also a movable hood 22 within and against which the opposite end of the reel base plate may be confined. This latter hood is in the form of an undercut block 23 which rests loosely upon the offset connecting plate 14 of the handle. From this block is extended a lug 24 which is slidably and guidably fitted within a slot 25 formed centrally of the seat plate 14. The movable hood may accordingly ride along upon the seat plate toward and from the fixed hood. These movements are effected by an adjusting screw 26 which extends lengthwise through the slot 25 and through a threaded bore within the block extension 24. The screw which is mounted in the transverse wall 12 is provided with an operating head 28 which may be conveniently knurled for manipulation. This head lies to the outside of the offset, i. e., remote from the seat whereon the reel is rested.

Between the screw head 28 and its threaded shank is a neck formed with an annular groove 29. One or more pins 30 anchored in the wall 12 present their inner ends within the groove 29 so as to secure the screw against longitudinal movement while permitting its free rotation. If desired, the end of the screw opposite the head may terminate in a spindle 31 of reduced diameter adapted for journaling within a socket 32 in the seat plate. The construction shown provides a screw means by which to move the one hood toward and from the other, whereby to lock opposite ends of the engaged reel base plate fixedly upon its base between clamping devices which abut and confine the base in place.

A similar securing means is provided for connecting the butt end of the rod to the handle. To maintain the rod in such connected relation, I provide a second screw 35 which is also mounted in the transverse wall 12 and so disposed as to present its threaded shank axially of the handle socket for engagement within the threaded socket 6 at the bottom end of the adapter. This screw is provided with a neck 36 having an annular groove 37 which receives the inner ends of one or more pins 38 that are anchored in the wall 12, as shown in Fig. 3. In this manner, the screw is maintained in a fixed longitudinal position withal being free to rotate. At its outer end the screw is provided with an operating head 39 which lies interiorly of the offset. By rotating this screw, the connection between the rod and handle is tightened, the one being drawn toward the other so as to ensure a correct and immovable fitting. To release this connection, the screw is merely reversed whereupon the rod and handle may be disassembled.

It is to be noted that the locking connections achieved by the mechanism herein disclosed are positive and dependable. The operations requisite both for locking and unlocking are simple and easily performed. By the arrangement of the various parts, as suggested, I economize on space, dispose the screw means out of the way, yet leave it in position convenient for manipulation, and utilize parts which are conveniently interchangeable. The screw means besides serving as the operator for the movable hood is a releasable retainer therefor as well, permitting the hood to be freely removed from the reel seat whenever occasion may require. Also by providing at opposite ends of the movable hood bearings for the screw means, the support for the latter is adequate to maintain the hood against deflection in any direction when advanced firmly against the proximate end of the reel base plate. The precise nature and form of the screw means to be employed, as well as of the other operating parts, may, of course, be variously modified, but any such changes which incorporate my invention, in whole or in part, I would include within the scope of my invention, as defined by the claims following.

I claim:

1. A fishing rod having a tapered butt end with a transverse wall formed with a threaded opening, in combination with a handle having at one end a tapered socket forming a seat for the butt end of the rod, and an adjusting screw carried by the handle engageable within the threaded opening at the butt end of the rod adapted to draw the rod tightly against its seat within the handle.

2. A fishing rod having its butt end closed by a transverse wall formed with a threaded opening therethrough, in combination with a handle provided at one end with a seat for receiving the butt end of the rod, and an adjusting screw carried by the handle engageable within the threaded opening of the butt end of the rod adapted to draw the latter tightly against its seat within the handle.

3. A fishing rod having its butt end closed by a transverse wall formed with a threaded opening therethrough, in combination with a handle having an offset between opposing end walls beyond one of which is a socketed extension forming a seat for receiving the butt end of the rod, screw means extending through an end wall of the handle and engageable within the threaded opening of the butt end of the rod adapted to draw the rod tightly within its seat, and an operating head for the screw means located interiorly of the offset of the handle.

4. A fishing rod to the butt end of which is fitted a tapered adapter closed at its outer end by a transverse wall formed with a threaded opening therethrough, in combination with a handle provided at one end with a tapered socket forming a seat for receiving the adapter, and an adjusting screw engageable within the threaded opening of the adapter adapted to connect the rod to the handle.

5. In combination, a fishing rod, a socketed handle into which the butt end of the rod may be fitted, and screw means mounted on one of said parts and having its axis parallel with that of the rod forming a releasable connection between the rod and handle, said screw means being rotatable independently of the parts with which it is connected.

6. In combination, a fishing rod, a socketed handle into which the butt end of the rod may be fitted, means for predetermining the relative rotative positions of the rod and handle when so interfitted, and screw means mounted on one of said parts and having its axis parallel with that of the rod forming a releasable connection between the rod and handle, said screw means being rotatable independently of the parts with which it is connected.

7. In combination, a fishing rod, a socketed handle into which the butt end of the rod may be fitted, means for predetermining the relative rotative positions of the rod and handle when so interfitted, and screw means mounted on the handle having its axis parallel with that of the rod forming a releasable connection between the rod and handle, said screw means being rotatable independently of the parts with which it is connected.

8. A fishing rod to the butt end of which is fitted an adapter, a handle having an offset between opposing end walls beyond one of which is a socketed extension for receiving the adapter, and screw means rotatably mounted on one of said parts with its axis parallel with that of the rod forming a releasable connection between the rod and handle, said screw means being rotatable independently of the parts with which it is connected.

9. In combination, a fishing rod handle having a slotted offset reel seat whereon may be rested the base plate of a reel, means at one end of the seat forming a fixed hood wherein one end of the reel base plate may be confined, a second hood movable toward and from the first hood adapted to abut and confine the opposite end of the reel base plate, means depending from the second hood in the reel seat slot and cooperating therewith to guide the hood in its movements, and an operator for the movable hood comprising a screw device rotatably secured to the rod handle at a point below the reel seat in threaded connection with the means depending from the movable hood.

10. A fishing reel handle provided with a seat which is slotted longitudinally and offset between opposing end walls in one of which is an undercut forming a fixed hood, screw means extended through the other end wall to lie within the seat slot lengthwise thereof, and having an operating head disposed exteriorly of the offset seat, and a second undercut hood slidably mounted on the seat having an apertured lug fitted to slide within the seat slot so as to be guided thereby, the lug aperture being threaded for coaction with the screw means which is extended therewithin to actuate the movable head toward and from the fixed hood to clamp therebetween opposite ends of a reel base plate.

11. In combination, a fishing rod handle having a slotted reel seat whereon may be rested the base plate of a reel, a pair of relatively movable confronting hoods for confining opposite ends of the reel base plate, one of the hoods being movable toward and from the other and having a portion of itself extended into the reel seat slot to be confined guidingly therein, and a screw device rotatably carried by the rod handle and extended lengthwise through the reel seat slot thereof in threaded connection with the guidingly confined portion of the movable hood adapted to move the latter toward and from the other hood.

12. In combination, a fishing rod handle comprising a grip portion, a reel seat and a socketed extension forming a seat for receiving the butt end of a rod, the reel seat being offset with relation to the grip portion and socketed extension of the handle, screw means disposed axially within the socketed extension adapted to coact with the butt end of a rod for securing the same in place, an operating head for the screw means disposed between the grip portion and socketed extension of the handle and in spaced relation to the offset reel seat, and a movable locking hood carried by the reel seat in a position opposite the operating head for the screw means without interference therewith.

JOHN HEDDON.